(12) United States Patent
Hirai

(10) Patent No.: US 11,822,408 B2
(45) Date of Patent: Nov. 21, 2023

(54) COMPUTER-READABLE RECORDING MEDIUM STORING PROGRAM AND MANAGEMENT METHOD

(71) Applicant: FUJITSU LIMITED, Kawasaki (JP)

(72) Inventor: Akira Hirai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 17/717,188

(22) Filed: Apr. 11, 2022

(65) Prior Publication Data

US 2023/0035134 A1 Feb. 2, 2023

(30) Foreign Application Priority Data

Aug. 2, 2021 (JP) .................................. 2021-126671

(51) Int. Cl.
*G06F 1/28* (2006.01)
*G06F 15/82* (2006.01)

(52) U.S. Cl.
CPC ................ *G06F 1/28* (2013.01); *G06F 15/82* (2013.01)

(58) Field of Classification Search
CPC .................................... G06F 1/28; G06F 15/82
See application file for complete search history.

(56) References Cited

U.S. PATENT DOCUMENTS

| | | | | |
|---|---|---|---|---|
| 2005/0278520 A1* | 12/2005 | Hirai | ........................ | G06F 1/329 713/1 |
| 2007/0185990 A1* | 8/2007 | Ono | ..................... | G06F 11/3452 709/224 |
| 2013/0346766 A1* | 12/2013 | Tani | ........................ | G06F 1/3206 713/300 |
| 2014/0149752 A1* | 5/2014 | Brock | ................. | G06F 11/3017 713/300 |
| 2014/0149779 A1* | 5/2014 | Allen-Ware | ........ | G06F 11/3013 713/340 |
| 2014/0344594 A1* | 11/2014 | Yokoyama | ............ | G06F 9/5094 713/300 |
| 2016/0098070 A1* | 4/2016 | Curran | ...................... | G06F 1/28 713/300 |
| 2016/0170474 A1* | 6/2016 | Takemura | ............. | G06F 9/4893 713/324 |
| 2016/0239331 A1* | 8/2016 | Tamura | ...................... | G06F 9/50 |

(Continued)

FOREIGN PATENT DOCUMENTS

JP 2012-164006 A 8/2012
JP 2012-181627 A 9/2012

*Primary Examiner* — Aurel Prifti
(74) *Attorney, Agent, or Firm* — Fujitsu Patent Center

(57) ABSTRACT

A recording medium stores a program for causing a computer to execute processing including: acquiring a first process execution time and energy consumption of a first processor core in the execution time when a process executed by the first processor core is switched from a first process to a second process; specifying one or more processes of a first process group to which the first process belongs, from among process groups each of which is a group of processes and calculating an index that indicates the energy consumption per unit time involved in execution of the first process group based on the execution time and the energy consumption acquired for the specified one or more processes; and controlling an operation of a processor core to which the process is allocated according to comparison between the index calculated for the first process group with a threshold.

7 Claims, 12 Drawing Sheets

(56) References Cited

U.S. PATENT DOCUMENTS

| | | | |
|---|---|---|---|
| 2016/0259578 A1* | 9/2016 | Hirai | G06F 3/0665 |
| 2018/0349191 A1* | 12/2018 | Dorsey | G06F 9/4856 |
| 2018/0356875 A1* | 12/2018 | Zhang | G06F 1/324 |
| 2020/0201736 A1* | 6/2020 | Nishiyama | G06F 1/08 |
| 2022/0026972 A1* | 1/2022 | Shah | G06F 1/3237 |
| 2022/0100247 A1* | 3/2022 | Garg | G06F 1/3203 |

* cited by examiner

FIG. 6

MANAGEMENT INFORMATION STORAGE UNIT — 140

PROCESS POWER CONSUMPTION MANAGEMENT TABLE — 141

| PROCESS ID | PROCESS GROUP ID | ENERGY CONSUMPTION (mJ) | EXECUTION TIME (msec) | AVERAGE POWER CONSUMPTION (W) |
|---|---|---|---|---|
| 100 | 1 | 240 | 100 | 2.4 |
| 101 | 1 | 275 | 110 | 2.5 |
| 102 | 2 | 230 | 100 | 2.3 |
| 103 | 2 | 225 | 90 | 2.5 |
| ... | ... | ... | ... | ... |

FIG. 7

MANAGEMENT INFORMATION STORAGE UNIT — 140

PROCESS GROUP POWER CONSUMPTION MANAGEMENT TABLE — 142

| PROCESS GROUP ID | PROCESS ID LIST | AVERAGE POWER CONSUMPTION (W) | THRESHOLD (W) |
|---|---|---|---|
| 1 | 100,101 | 4.9 | 5 |
| 2 | 102,103 | 4.8 | 5 |
| 3 | 104,105,106 | 2.3 | 10 |
| ... | ... | ... | ... |

FIG. 10

140 — MANAGEMENT INFORMATION STORAGE UNIT

141a — PROCESS POWER CONSUMPTION MANAGEMENT TABLE

| PROCESS ID | PROCESS GROUP ID | ENERGY CONSUMPTION (mJ) | EXECUTION TIME (msec) | AVERAGE POWER CONSUMPTION (W) |
|---|---|---|---|---|
| 100 | 1 | 260 | 100 | 2.6 |
| 101 | 1 | 275 | 110 | 2.5 |
| 102 | 2 | 230 | 100 | 2.3 |
| 103 | 2 | 225 | 90 | 2.5 |
| ... | ... | ... | ... | ... |

142a — PROCESS GROUP POWER CONSUMPTION MANAGEMENT TABLE

| PROCESS GROUP ID | PROCESS ID LIST | AVERAGE POWER CONSUMPTION (W) | THRESHOLD (W) |
|---|---|---|---|
| 1 | 100,101 | 5.1 | 5 |
| 2 | 102,103 | 4.8 | 5 |
| ... | ... | ... | ... |

FIG. 11

140 MANAGEMENT INFORMATION STORAGE UNIT

141b PROCESS POWER CONSUMPTION MANAGEMENT TABLE

| PROCESS ID | PROCESS GROUP ID | ENERGY CONSUMPTION (mJ) | EXECUTION TIME (msec) | AVERAGE POWER CONSUMPTION (W) |
|---|---|---|---|---|
| 100 | 1 | 260 | 100 | 2.6 |
| 101 | 1 | 230 | 100 | 2.3 |
| 102 | 2 | 230 | 100 | 2.3 |
| 103 | 2 | 225 | 90 | 2.5 |
| ... | ... | ... | ... | ... |

142b PROCESS GROUP POWER CONSUMPTION MANAGEMENT TABLE

| PROCESS GROUP ID | PROCESS ID LIST | AVERAGE POWER CONSUMPTION (W) | THRESHOLD (W) |
|---|---|---|---|
| 1 | 100,101 | 4.9 | 5 |
| 2 | 102,103 | 4.8 | 5 |
| ... | ... | ... | ... |

COMPUTER-READABLE RECORDING MEDIUM STORING PROGRAM AND MANAGEMENT METHOD

CROSS-REFERENCE TO RELATED APPLICATION

This application is based upon and claims the benefit of priority of the prior Japanese Patent Application No. 2021-126671, filed on Aug. 2, 2021, the entire contents of which are incorporated herein by reference.

FIELD

The embodiments discussed herein are related to a program and a management method.

BACKGROUND

Currently, many processors included in an information processing device are multi-core processors. The processor includes a plurality of processor cores and may execute a plurality of calculations in parallel using the plurality of processor cores. Here, a technique is considered for controlling an operation of the processor.

Japanese Laid-open Patent Publication No. 2012-164006 and Japanese Laid-open Patent Publication No. 2012-181627 are disclosed as related art.

SUMMARY

According to an aspect of the embodiments, a non-transitory computer-readable recording medium stores a program for causing a computer to execute processing including: acquiring a first process execution time and energy consumption of a first processor core in the execution time when a process executed by the first processor core of a plurality of processor cores is switched from a first process to a second process; specifying one or more processes that belong to a first process group to which the first process belongs, from among a plurality of process groups each of which is a group of processes and calculating an index that indicates the energy consumption per unit time involved in execution of the first process group on the basis of the execution time and the energy consumption acquired for the specified one or more processes; and controlling an operation of a processor core to which the process is allocated according to comparison between the index calculated for the first process group with a threshold when execution of the process that belongs to the first process group is started next.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of a process power consumption management table;

FIG. 7 is a diagram illustrating an example of a process group power consumption management table;

FIG. 10 is a diagram illustrating a first example of a transition of management information;

FIG. 11 is a diagram illustrating a second example of the transition of the management information.

DESCRIPTION OF EMBODIMENTS

For example, an information processing device has been proposed that counts the number of occurrences of an event such as the number of execution commands or the number of memory accesses for each process. At the time when process switching occurs, the proposed information processing device determines whether an overclocking function of the processor is enabled or disabled on the basis of a result of comparison between a count value of the number of occurrences of the event for the switched process and a threshold and controls a clock frequency. As a result, while a processing efficiency of the processor is effectively improved according to operation characteristics of the process, wasteful power consumption is suppressed.

Furthermore, a multiprocessor system has been also proposed that manages logical processors that are correlated to each other, such as executing processing with about the same load as a group. The proposed multiprocessor system determines power state information of a physical processor to which a logical processor is allocated, on the basis of power state information of the logical processor belonging to a logical processor group to which the logical processor to be allocated to the physical processor belongs.

As in the proposal described above, it is considered to improve control of energy consumed in a unit time by a processor and a processing efficiency of the processor through operation control such as changing a clock frequency. By the way, an information processing device may manage each process as a group of processes corresponding to jobs, virtual machines, containers, or the like, for example, a process group. For example, an operating system of the information processing device may manage a plurality of process groups that exists at a certain point of time.

However, as in the proposal described above, with a method for controlling the clock frequency in processor unit according to the comparison result between the count value of the event and the threshold for each process, it may be difficult to efficiently use the processor for each process group. For example, there is a problem in that, in a case where a processor core that executes a process in a certain process group and another processor core that executes a process in another process group exist in the same processor, it is not possible to finely control an operation of the processor for each process group.

In one aspect, an object of the embodiment is to provide a program and a management method that can efficiently use a processor.

Hereinafter, the embodiment will be described with reference to the drawings.

First Embodiment

A first embodiment will be described.

Figure 1:
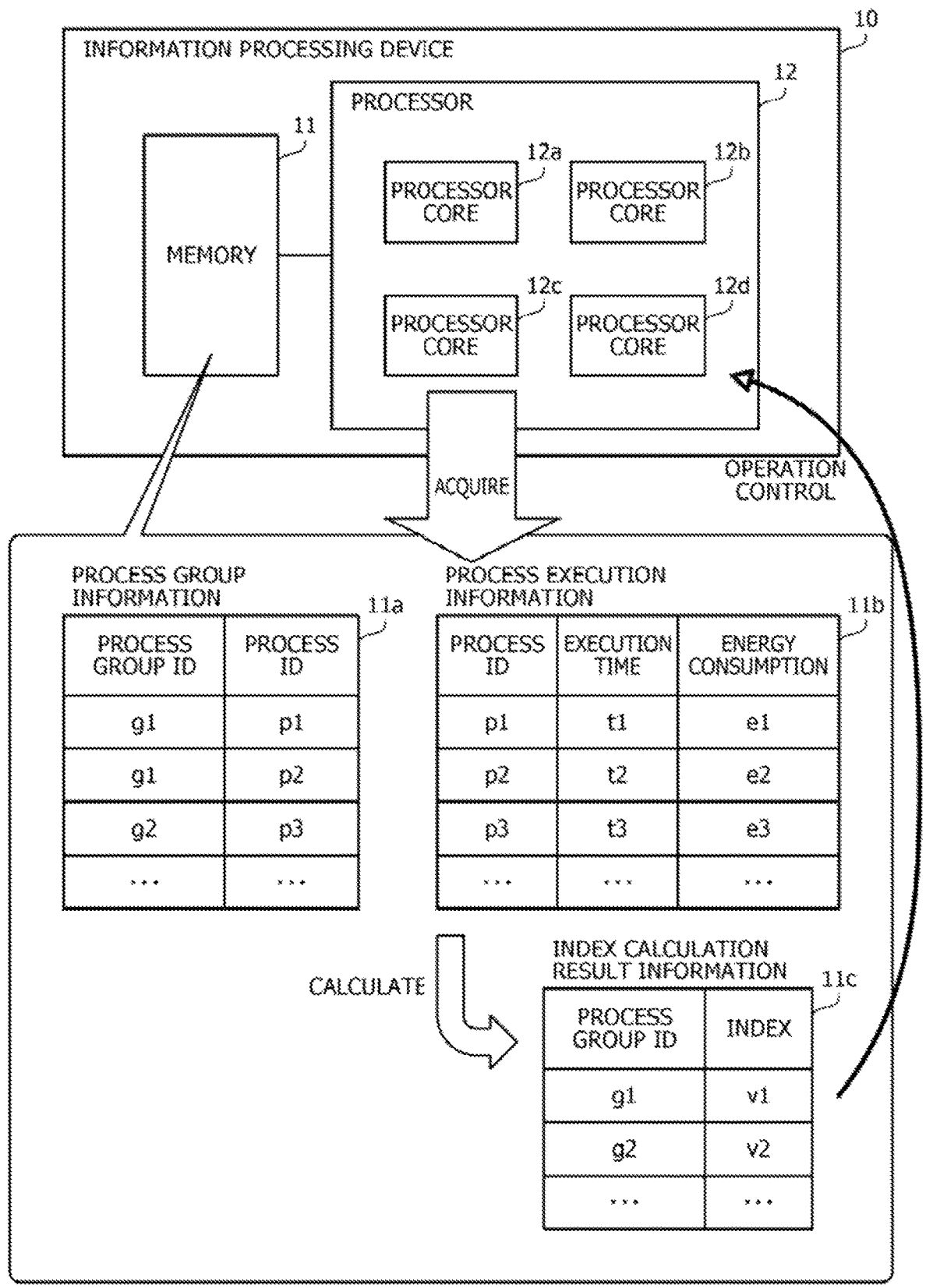
FIG. 1 is a diagram explaining an information processing device according to a first embodiment.

FIG. 1 is a diagram for explaining an information processing device according to the first embodiment.

An information processing device 10 includes a memory 11 and a processor 12. The memory 11 is a volatile storage device, for example, a random access memory (RAM) or the like. The processor 12 may include a CPU, a digital signal processor (DSP), a graphics processing unit (GPU), or the like. The processor 12 includes a plurality of processor cores. The information processing device 10 may include a plurality of processors. One process is allocated to one processor core at one timing. A plurality of processes is allocated to one processor core in a time-division manner.

The memory 11 includes process group information 11a, process execution information 11b, and index calculation result information 11c. The process group information 11a is information that associates a process group with a process belonging to the process group. The process group is a group of processes. The process group corresponds to a group of processes corresponding to a job, an application, a virtual machine, a container, or the like. One or more processes belong to the process group.

The process group is managed, for example, by an operating system executed by the information processing device 10. The process group is identified according to a process group identifier (ID) that is identification information of a process group. A process group with a process group ID "gn" is referred to as a process group gn. The symbol n is a natural number. The process is identified according to a process ID that is identification information of a process. A process with a process ID "pn" is referred to as a process pn.

For example, the process group information 11a indicates that processes p1 and p2 belong to a process group g1. Furthermore, the process group information 11a indicates that a process p3 belongs to a process group g2. The process group information 11a may also include information regarding other process groups. The process group information 11a may be information generated by the operating system or may be information acquired from the operating system.

The process execution information 11b is information that associates a process with process execution information. The process execution information includes a process execution time and energy consumption processor core unit involved in the execution of the process. The process execution time is an execution time immediately before the corresponding process by one processor core. The energy consumption is energy consumed by the processor core. The unit of energy is, for example, joule (J).

The index calculation result information 11c is information that holds a calculation result of an index of the energy consumption per unit time for each process group. The index is calculated by the processor 12 on the basis of the execution information for each process held in the process execution information 11b. The unit time may be one second. For example, the unit of the index may be watt (W) (=joule per second (J/s)). In a case where watt is used as the unit of the index, an index of energy consumption per unit time for each process group is an index of power consumption for each process group.

The processor 12 includes processor cores 12a, 12b, 12c, and 12d. The processor 12 executes a plurality of processes in parallel using the processor cores 12a to 12d. The processor 12 can individually control operation frequencies and voltages of the processor cores 12a to 12d. The control of the operation frequency can be also referred to as control of a frequency of an operation clock. The processor 12 controls operations of the processor cores 12a to 12d described below using some of the processor cores 12a to 12d. However, the processor 12 may include a processor core that controls the operations of the processor cores 12a to 12d separately from the processor cores 12a to 12d.

When a process executed by a first processor core is switched from a first process to a second process, the processor 12 acquires a first process execution time and energy consumption of the first processor core in the execution time. The processor 12 associates the acquired execution time and energy consumption with a process ID of the first process and records the associated information in the process execution information 11b.

For example, when a process executed by the processor core 12c is switched from the process p1 to another process, the processor 12 acquires an execution time of the process p1 and energy consumption of the processor core 12c in the execution time. The processor 12 may acquire the execution time, for example, from a timer of the process execution time managed by the operating system. The timer measures an execution time from start of the execution of the process p1 to switching. Alternatively, the processor 12 may obtain the execution time, for example, from a difference between an execution start time of a process managed by the operating system and a time of a time point when the process is switched to another process.

Furthermore, the processor 12 may acquire the energy consumption of the processor core from a performance monitoring counter included in the processor core. The performance monitoring counter counts the number of occurrences of events that occur when a certain amount of energy is consumed by the corresponding processor core. The processor 12 resets a count value of the performance monitoring counter of the processor core 12c, for example, when the processor core 12c starts to execute the process p1. Then, the processor 12 reads the count value of the performance monitoring counter of the processor core 12c when the process executed by the processor core 12c is switched from the process p1 to the another process and acquires energy consumption on the basis of the count value.

For example, the processor 12 acquires an execution time t1 and energy consumption e1 for the process p1 and records the execution time t1 and the energy consumption e1 in the process execution information 11b.

The processor 12 specifies one or more processes that belong to a first process group to which the first process belongs. For example, the processor 12 specifies the processes p1 and p2 that belong to the process group g1 to which the process p1 belongs, on the basis of the process group information 11a.

The processor 12 calculates an index indicating energy consumption per unit time involved in execution of the first process group on the basis of the execution time and the energy consumption acquired for the specified one or more processes. The processor 12 records the calculated index, in association with a process group ID, in the index calculation result information 11c.

The index is, for example, an integrated value (sum) of energy consumption per unit time by the processes belonging to the corresponding process group. Alternatively, the index may be an average value of the energy consumption per unit time of the processes belonging to the corresponding process group. As still another example, the index may be a value obtained by dividing a sum of the energy consumption recorded for each process belonging to the corresponding process group by a sum of the execution time recorded for each process belonging to the corresponding process group.

For example, the processor 12 calculates an index v1 for the process group g1 on the basis of the execution times t1 and t2 and the energy consumptions e1 and e2 of the respective processes p1 and p2 recorded in the process execution information 11b. The processor 12 records the index v1 in the index calculation result information 11c in association with the process group g1.

When starting to execute a process belonging to the first process group next, the processor 12 controls an operation of a processor core to which the process is allocated according to comparison between the index calculated for the first process group and a threshold. For example, when starting to execute the process p2 belonging to the process group g1 next, the processor 12 controls the operation of the processor core 12d to which the process p2 is allocated according to comparison between the index v1 calculated for the process group g1 with the threshold. As the threshold, a uniform value may be set for the plurality of process groups or different values may be respectively set to the plurality of process groups. The threshold is stored in the memory 11 in advance.

As an example of the control of the operation of the processor core, at least one of a change in the operation frequency or a change in the voltage of the processor core is considered. Furthermore, the control of the operation of the processor core may be control for reducing power consumption of the processor core.

For example, in a case where the index v1 is larger than the threshold, the processor 12 may reduce power consumption by the processor core 12d by lowering at least one of the operation frequency and the voltage of the processor core 12d. Alternatively, in a case where the index v1 is smaller than the threshold, the processor 12 may accelerate calculation by the processor core 12d by increasing the operation frequency or the voltage of the processor core 12d.

According to the information processing device 10, when the process executed by the first processor core is switched from the first process to the second process, the first process execution time and the energy consumption of the first processor core in the execution time are acquired. One or more processes belonging to the first process group to which the first process belongs are specified from among the plurality of process groups. An index indicating energy consumption per unit time involved in the execution of the first process group is calculated on the basis of execution times and energy consumption acquired for the specified one or more processes. When execution of the process belonging to the first process group is started next, an operation of a processor core to which the process is allocated is controlled according to comparison between the index calculated for the first process group and the threshold.

As a result, the information processing device 10 can efficiently use the processor 12.

For example, even in a case where a processor core that executes a process of one process group and another processor core that executes a process of another process group exist in the same processor, the information processing device 10 can control the operation of the processor of each process group.

Furthermore, as described above, the information processing device 10 can individually control the operation frequency and the voltage of each processor core according to the process group.

Therefore, for example, the information processing device 10 can prevent power consumption caused by a calculation by one process group from being excessive and can increase a speed of calculation for a process group with relatively small power consumption. Alternatively, by adjusting the threshold for each process group, control can be performed for causing a process group with higher importance or higher priority to use a relatively large amount of power resources.

Furthermore, the unit of the process group corresponding to the job, the application, the virtual machine, the container, or the like may be used as one unit of a service provided to a user. Therefore, by making it possible to control the operation of the processor in process group unit, the information processing device 10 can easily perform control in consideration of power efficiency, a charging amount according to power consumption at the time when the user uses the service, or the like.

Note that, in the first embodiment, an example has been described in which the processor 12 includes the plurality of processor cores. However, the number of processor cores included in the processor 12 may be one. For example, the information processing device 10 may include a plurality of single core processors. In this case, the information processing device 10 can efficiently use the plurality of processors included in the information processing device 10 for each process group.

Second Embodiment

Next, a second embodiment will be described.

Figure 2:
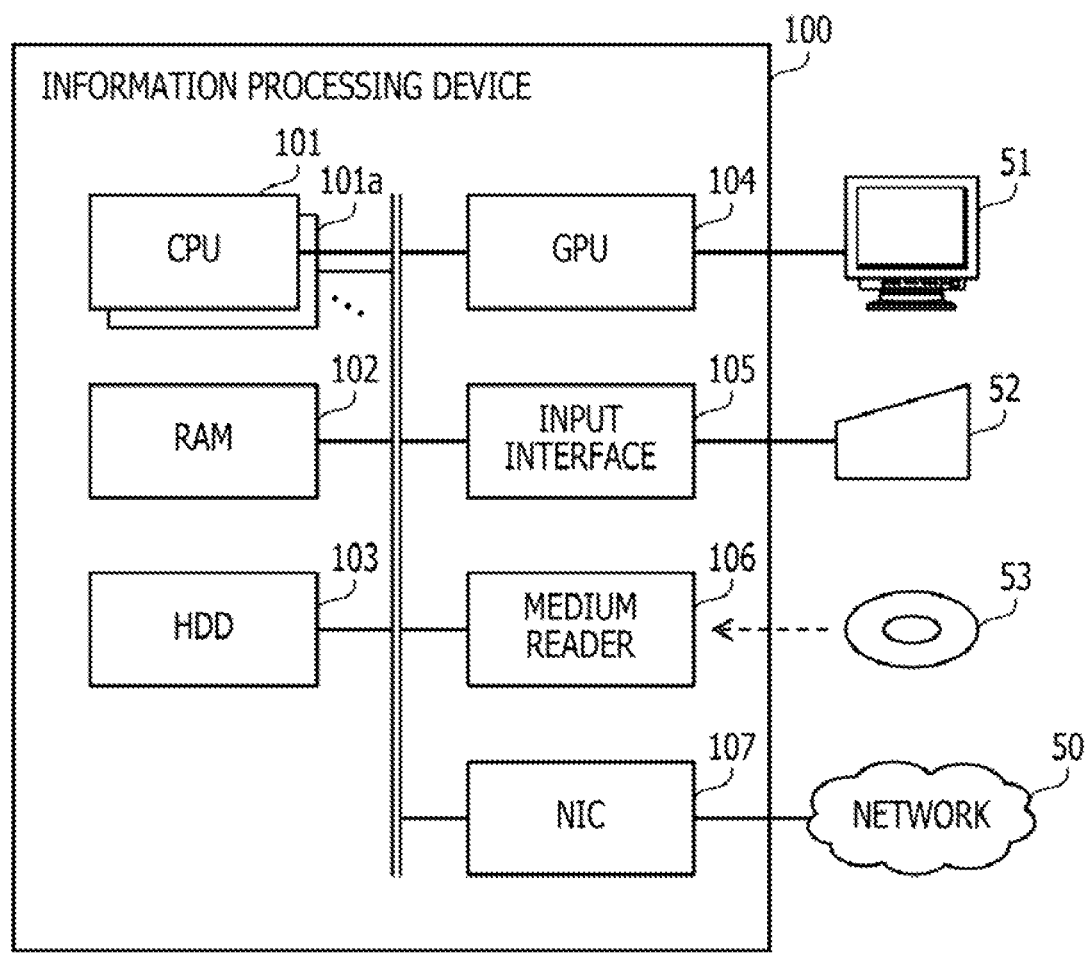
FIG. 2 is a diagram illustrating a hardware example of an information processing device according to a second embodiment.

FIG. 2 is a diagram illustrating a hardware example of an information processing device according to the second embodiment.

An information processing device 100 includes CPUs 101, 101a, . . . , a RAM 102, a hard disk drive (HDD) 103, a GPU 104, an input interface 105, a medium reader 106, and a network interface card (NIC) 107. Note that each of the CPUs 101, 101a, . . . is an example of the processor 12 in the first embodiment. The RAM 102 is an example of the memory 11 in the first embodiment. The information processing device 100 may be referred to as a computer.

The CPUs 101, 101a, . . . are processors that execute a command of a program. The CPUs 101, 101a, . . . load at least a part of programs and data stored in the HDD 103 into the RAM 102 and execute the program. The CPUs 101, 101a, . . . include a plurality of processor cores. Processing described later may be executed in parallel using a plurality of processors or processor cores. Furthermore, a set of the plurality of processors may be referred to as a "multiprocessor" or simply a "processor".

The RAM 102 is a volatile semiconductor memory that temporarily stores the programs executed by the CPUs 101, 101a, . . . and data used for calculation by the CPUs 101, 101a, . . . . Note that the information processing device 100 may include a memory of a type other than the RAM, or may include a plurality of memories.

The HDD 103 is a non-volatile storage device that stores a program of software such as an operating system (OS), middleware, and application software, and data. Note that the information processing device 100 may include other types of storage devices such as a flash memory or a solid state drive (SSD), and may include a plurality of non-volatile storage devices.

The GPU 104 outputs an image to a display 51 connected to the information processing device 100 according to a command from the CPU 101. As the display 51, any type of display such as a cathode ray tube (CRT) display, a liquid crystal display (LCD), a plasma display, or an organic electro-luminescence (OEL) display may be used.

The input interface 105 acquires an input signal from an input device 52 connected to the information processing device 100 and outputs the input signal to the CPU 101. As the input device 52, a pointing device such as a mouse, a touch panel, a touch pad, or a trackball, a keyboard, a remote controller, a button switch, or the like may be used. Furthermore, a plurality of types of input devices may be connected to the information processing device 100.

The medium reader 106 is a reading device that reads programs and data recorded in a recording medium 53. As the recording medium 53, for example, a magnetic disk, an optical disk, a magneto-optical (MO) disk, a semiconductor memory, or the like may be used. The magnetic disk includes a flexible disk (FD) and an HDD. The optical disk includes a compact disc (CD) and a digital versatile disc (DVD).

The medium reader 106 copies, for example, the program and data read from the recording medium 53 to another recording medium such as the RAM 102 or the HDD 103. The read program is executed by the CPU 101, for example. Note that the recording medium 53 may be a portable recording medium, and may be used for distribution of the program and data. Furthermore, the recording medium 53 and the HDD 103 may be referred to as computer-readable recording media.

The NIC 107 is an interface that is connected to a network 50 and communicates with another computer through the network 50. The NIC 107 is connected to a communication device such as a switch or a router with a cable, for example. The NIC 107 may be a wireless communication interface.

Figure 3:
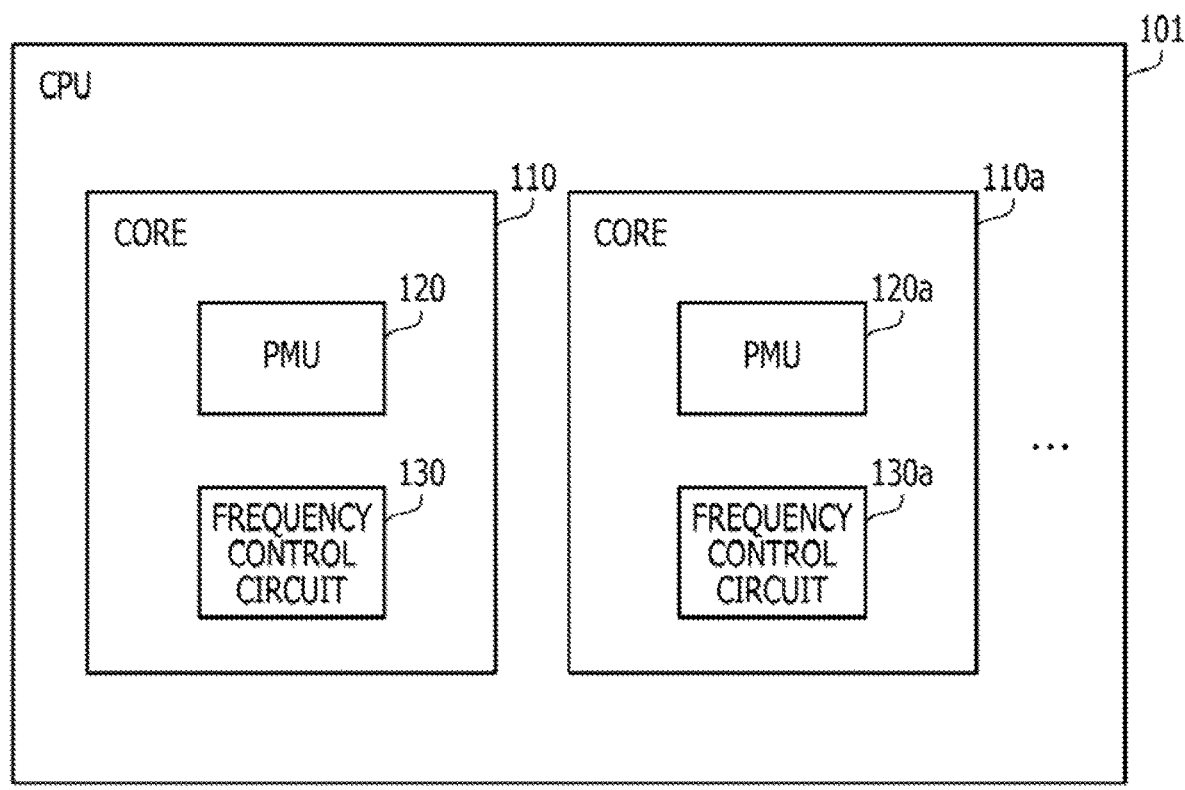
FIG. 3 is a diagram illustrating a hardware example of a central processing unit (CPU)

FIG. 3 is a diagram illustrating a hardware example of a CPU.

The CPU 101 includes cores 110, 110a, . . . . The cores 110, 110a, . . . are arithmetic circuits that perform calculations. The CPU 101 executes a plurality of processes in parallel using the cores 110, 110a, . . . . Each of the cores 110, 110a, . . . may be referred to as a processor core or a CPU core. A plurality of processes may be executed in a time-division manner, for example, one core executes a first process, interrupts the execution of the first process, and then, executes a second process next. Moreover, the core or another core may restart to execute the interrupted first process.

The core 110 includes a PMU 120 and a frequency control circuit 130. The core 110a includes a PMU 120a and a frequency control circuit 130a.

The PMU 120 measures the number of occurrences of various events in the core 110. The event measured by the PMU 120 includes an event related to energy consumption. For example, the PMU 120 includes a counter that can cause an event each time when the energy consumption of the core 110 reaches a certain value and counts the number of occurrences of the event.

The frequency control circuit 130 controls an operation frequency of the core 110, for example, a frequency of an operation clock. For example, the frequency control circuit 130 increases or decreases the operation frequency of the core 110.

The PMU 120a has a similar function to the PMU 120. The frequency control circuit 130a has a similar function to the frequency control circuit 130. Furthermore, another core other than the cores 110 and 110a includes a PMU and a frequency control circuit.

Other CPUs including the CPU 101a includes a plurality of cores similarly to the CPU 101.

Figure 4:
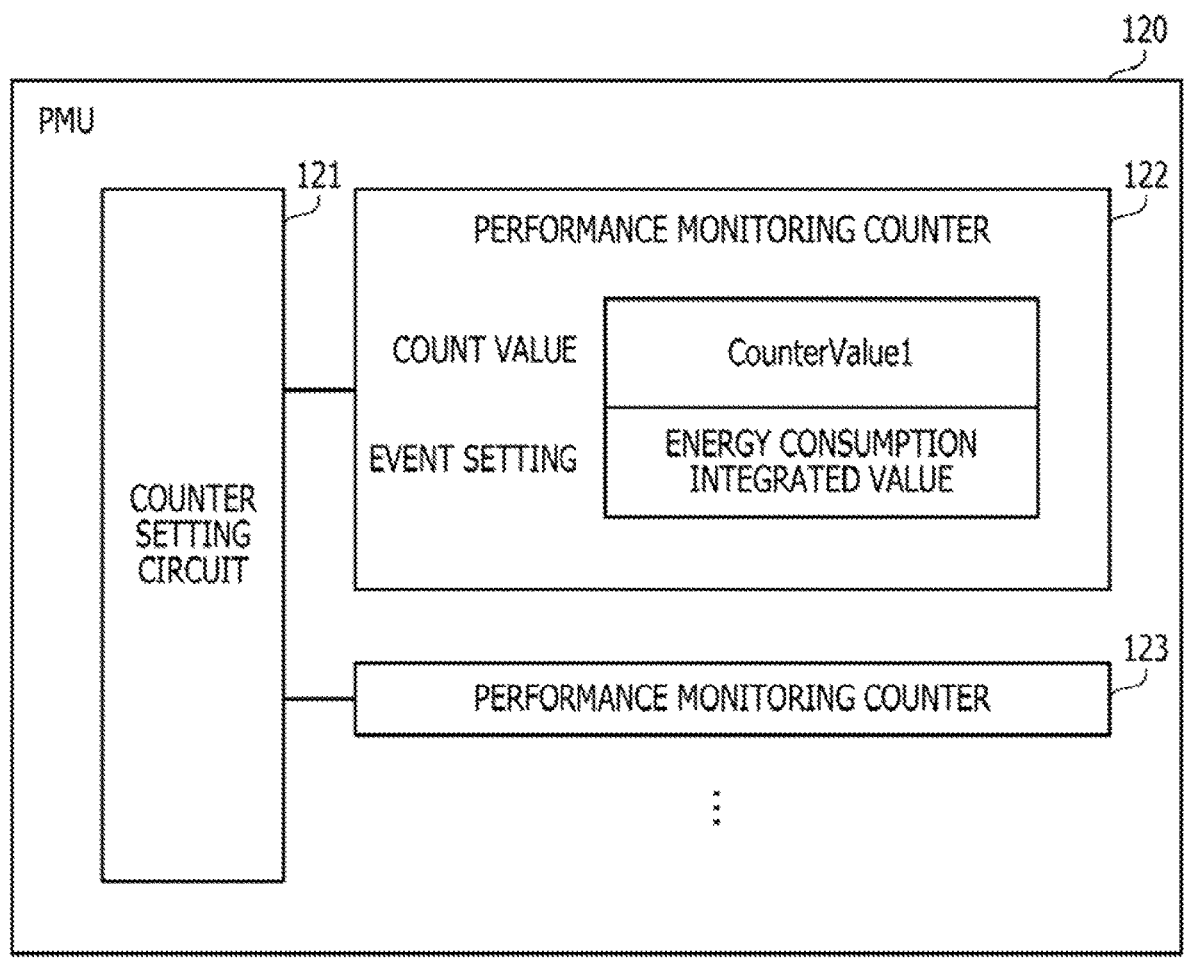
FIG. 4 is a diagram illustrating a hardware example of a performance monitoring unit (PMU)

FIG. 4 is a diagram illustrating a hardware example of a PMU.

The PMU 120 includes a counter setting circuit 121 and performance monitoring counters 122, 123, . . . .

The counter setting circuit 121 sets identification information of the event counted by each of the performance monitoring counters 122, 123, . . . to each of the performance monitoring counters 122, 123, . . . .

The performance monitoring counters 122, 123, . . . are counters that count events occurred in the core 110. To each of the performance monitoring counters 122, 123, . . . , the identification information of the event to be counted is set. Each of the performance monitoring counters 122, 123, . . . counts the number of occurrences of the event corresponding to the set identification information of the event. A count value of each of the performance monitoring counters 122, 123, . . . corresponds to the number of occurrences of the event.

For example, the counter setting circuit 121 sets an "energy consumption integrated value" as the event to be counted to the performance monitoring counter 122. In this case, the performance monitoring counter 122 increments a count value CounterValue1 by one each time when the core 110 consumes a certain amount of energy. The count value CounterValue1 of the performance monitoring counter 122 is a value corresponding to the energy consumption integrated value. The count value of the performance monitoring counter 122 is reset to zero when a process allocated to the core 110 is switched.

The counter setting circuit 121 may set identification information of another event to another performance monitoring counter including the performance monitoring counter 123 and make the another performance monitoring counter count the number of occurrences of the another event.

Figure 5:
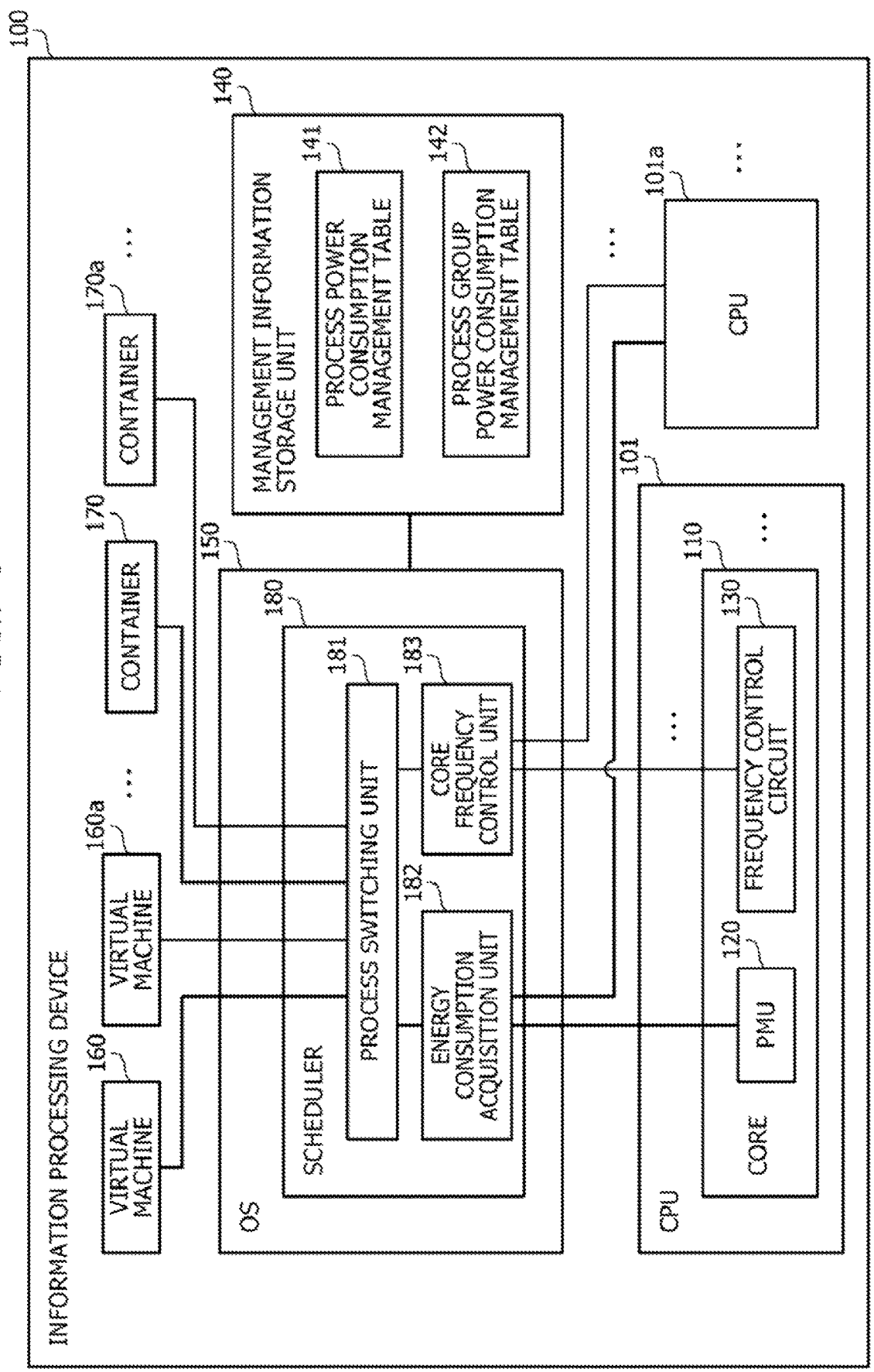
FIG. 5 is a diagram illustrating a functional example of an information processing device.

FIG. 5 is a diagram illustrating a functional example of the information processing device.

The information processing device 100 includes a management information storage unit 140, an OS 150, virtual machines 160, 160a, . . . , and containers 170, 170a, . . . . Storage areas of the RAM 102 and the HDD 103 are used for the management information storage unit 140. The CPU 101 executes a program stored in the RAM 102 to achieve functions of the OS 150, the virtual machines 160, 160a, . . . , and the containers 170, 170a, . . . .

The management information storage unit 140 stores management information. The management information is data used for processing of the OS 150. The management information includes a process power consumption management table 141 and a process group power consumption management table 142. The process power consumption management table 141 is a table that holds power consumption of a core involved in execution of a process. The process group power consumption management table 142 is a table that holds an index of energy consumption in unit time of a core in process group unit.

The OS 150 controls operations of hardware and software of the information processing device 100. The OS 150 causes the virtual machines 160, 160a, . . . and the containers 170, 170a, . . . to operate using hardware resources of the information processing device 100. The OS 150 manages the process of each of the virtual machines 160, 160a, . . . and the containers 170, 170a, . . . . The process is an execution unit of processing managed by the OS 150 for each of the virtual machines 160, 160a, . . . and the containers 170, 170a, . . . .

The OS 150 includes a scheduler 180. The scheduler 180 allocates a process to each core of each of the CPUs 101, 101a, . . . and controls an operation frequency of each core. The scheduler 180 includes a process switching unit 181, an energy consumption acquisition unit 182, and a core frequency control unit 183.

The process switching unit 181 allocates the process included in each of the virtual machines 160, 160a, . . . and the containers 170, 170a, . . . to each core. The process switching unit 181 switches the process allocated to each core.

Here, each of the virtual machines 160, 160a . . . , and the containers 170, 170a, . . . includes one or more processes executed in response to an input of a user's processing request or the like. The OS 150 manages each of the virtual machines 160, 160a, . . . and the containers 170, 170a, . . . as a process group.

The number of processes belonging to the process group increases or decreases over time. For example, at a certain timing, a process belonging to a process group is newly generated, and at another timing, a process belonging to the process group disappears. The process switching unit 181 allocates a plurality of processes to one core in a time-division manner.

The energy consumption acquisition unit 182 refers to the performance monitoring counter of the PMU of each core included in each of the CPUs 101, 101a, . . . and reads a count value corresponding to the energy consumption integrated value of the core. The energy consumption acquisition unit 182 acquires energy consumption on the basis of the read count value.

For example, the energy consumption acquisition unit 182 acquires the energy consumption of the core involved in the execution of the process and the process execution time at the time of process switching by the process switching unit 181 and records the acquired energy consumption and execution time in the process power consumption management table 141.

The energy consumption acquisition unit 182 acquires energy consumption of a core involved in execution of a process on the basis of the count value of the performance monitoring counter of the PMU of the core. The energy consumption acquisition unit 182 resets the count value of the performance monitoring counter of the PMU of the core immediately before the core starts to execute a next process. The energy consumption acquisition unit 182 refers to a timer that measures a process execution time managed by the OS 150 and acquires an execution time immediately before the process. The energy consumption acquisition unit 182 may obtain an execution time from a difference between a previous execution start time of the process managed by the OS 150 and a time of a time point when the process is switched to another process.

Furthermore, the energy consumption acquisition unit 182 calculates an index of energy consumption per unit time in process group unit on the basis of the process power consumption management table 141. The energy consumption acquisition unit 182 records the calculated index in the process group power consumption management table 142. The index of the energy consumption per unit time may be an index of power consumption. The index of the energy consumption per unit time is, for example, average power consumption. The index of the energy consumption per unit time may be an average power consumption amount. The unit of the average power consumption amount is a product of watt (W) and time (length of unit time).

The core frequency control unit 183 controls an operation of each core included in each of the CPUs 101, 101a, . . . on the basis of the process group power consumption management table 142. For example, the core frequency control unit 183 performs control for reducing power consumption of the core to which the process belonging to the process group of which the index of the energy consumption is equal to or more than a threshold is allocated. The control for reducing the power consumption is, for example, reducing at least one of the operation frequency and the voltage of the corresponding core.

Each of the virtual machines 160, 160a, . . . is a virtual computer that operates on the OS 150 of the information processing device 100. The information processing device 100 may be referred to as a physical machine relative to the virtual machine.

Furthermore, each of the containers 170, 170a, . . . is an isolated execution environment for one or more processes. For example, in container-type virtualization, a container that collects resources such as libraries used to execute software is defined as a software execution environment. For example, the information processing device 100 activates a container on a kernel of the OS 150 and executes software using the container.

FIG. 6 is a diagram illustrating an example of a process power consumption management table.

The process power consumption management table 141 is stored in the management information storage unit 140. The process power consumption management table 141 includes items of a process ID, a process group ID, energy consumption, an execution time, and average power consumption.

A process ID is registered in the item of the process ID. In the item of the process group ID, a process group ID of a process group to which the process with the corresponding process ID belongs is registered. In the item of the energy consumption, energy consumption involved in execution of a process is registered. The unit of energy consumption is, for example, millijoule (mJ). In the item of the execution time, a process execution time is registered. The process execution time corresponds to a time in which energy consumption is monitored. The unit of the execution time is, for example, millisecond (msec). In the item of the average power consumption, average power consumption involved in execution of a process is registered. The unit of the average power consumption is, for example, watt (W). The average power consumption is calculated as (energy consumption/execution time).

For example, the process power consumption management table 141 includes a record having a process ID "100", a process group ID "1", energy consumption "240", an execution time "100", and average power consumption "2.4". This record indicates that a process with the process ID "100" belongs to a process group with the process group ID "1", energy consumption of the process is 240 mJ and an execution time is 100 msec, and average power consumption is 240 (mJ)/100 (msec)=2.4 W.

A record of another process is also registered in the process power consumption management table 141. The process power consumption management table 141 is an example of the process group information 11a and the process execution information 11b according to the first embodiment.

Here, a process may take three states including an execution state, an executable state, and a waiting state from the generation of the process to the disappearance of the process. For example, the execution of the process is interrupted in the middle or restarted in a manner in which execution, execution interruption, execution, and execution interruption are performed in a chronological order. On the other hand, the energy consumption acquisition unit 182 records energy consumption, an execution time, and average power consumption at the time of latest execution for the same process ID in the process power consumption management table 141. In this way, the energy consumption acquisition unit 182 may hold the latest value of the energy consumption in unit time involved in the execution of each process. As a result, the energy consumption acquisition unit 182 can appropriately obtain an index of energy consumption in process group unit to be described later. This is because there is a high possibility that old information regarding energy consumption of each process is different from current energy consumption.

In a case where a new process is generated, the energy consumption acquisition unit 182 adds a record of the corresponding process to the process power consumption management table 141. The energy consumption acquisition unit 182 registers values of the process ID and the process group ID to the record at the time of adding the record. Note that the energy consumption acquisition unit 182 acquires a correspondence between the process ID and the process group ID from the OS 150. The energy consumption acquisition unit 182 does not set items of energy consumption, an execution time, and average power consumption of the record at the time of adding the record. The energy consumption acquisition unit 182 does not use the record of which the items of the energy consumption, the execution time, and the average power consumption are not set for calculation of the index of the energy consumption in process group unit. Furthermore, in a case where an existing process disappears, the energy consumption acquisition unit 182 deletes a record of the corresponding process from the process power consumption management table 141.

Moreover, the energy consumption acquisition unit 182 may hold only information of a process executed in the latest predetermined time period in the process power consumption management table 141. As the predetermined time period, five minutes, 10 minutes, or the like can be considered. In this way, the energy consumption acquisition unit 182 may hold the latest value of the energy consumption in unit time for each core. As a result, the energy consumption acquisition unit 182 can appropriately obtain an index of energy consumption in process group unit to be described later. This is because there is a high possibility that old information regarding energy consumption of each process is different from current energy consumption.

FIG. 7 is a diagram illustrating an example of a process group power consumption management table.

The process group power consumption management table 142 is stored in the management information storage unit 140. The process group power consumption management table 142 includes items of a process group ID, a process ID list, average power consumption, and a threshold.

In the item of the process group ID, a process group ID is registered. In the item of the process ID list, a list of process IDs of processes belonging to the process group having the corresponding process group ID, for example, a process ID list is registered. In the item of the average power consumption, average power consumption calculated for the process group ID is registered. The unit of the average power consumption is, for example, watt (W). In the item of the threshold, a threshold for the corresponding process group ID is registered. The unit of the threshold is, for example, watt (W).

Here, the energy consumption acquisition unit 182 sets a sum of average power consumption of processes recorded in the process power consumption management table 141 for one process group as average power consumption in process group unit.

For example, a process with a process ID "100" and a process with a process ID "101" belong to a process group with a process group ID "1". According to the process power consumption management table 141, average power consumption of the process with the process ID "100" is 2.4 W. Furthermore, average power consumption of the process with the process ID "101" is 2.5 W. Therefore, the energy consumption acquisition unit 182 calculates average power consumption of the process group ID "1" as 2.4+2.5=4.9 W for the process power consumption management table 141.

For example, the process group power consumption management table 142 includes a record having a process group ID "1", a process ID list "100, 101", average power consumption "4.9", and a threshold "5". This record indicates that a process with a process ID "100" and a process with a process ID "101" belong to a process group with the process group ID "1". Furthermore, the record indicates that average power consumption of the process group is 4.9 W and the threshold is five W.

A record of another process group is registered in the process group power consumption management table 142. The process group power consumption management table 142 is an example of the index calculation result information 11c according to the first embodiment.

Next, a processing procedure of the information processing device 100 will be described. The information processing device 100 executes the following procedure when a process executed by a core is switched to another process. A process that is a switching source is referred to as a switching source process. A process that is a switching destination is referred to as a switching destination process.

As an example, a case will be described where the process switching unit 181 switches a process for the core 110. Also in a case where the information processing device 100 switches a process for another core, the information processing device 100 executes the similar procedure below on the another core.

Figure 8:
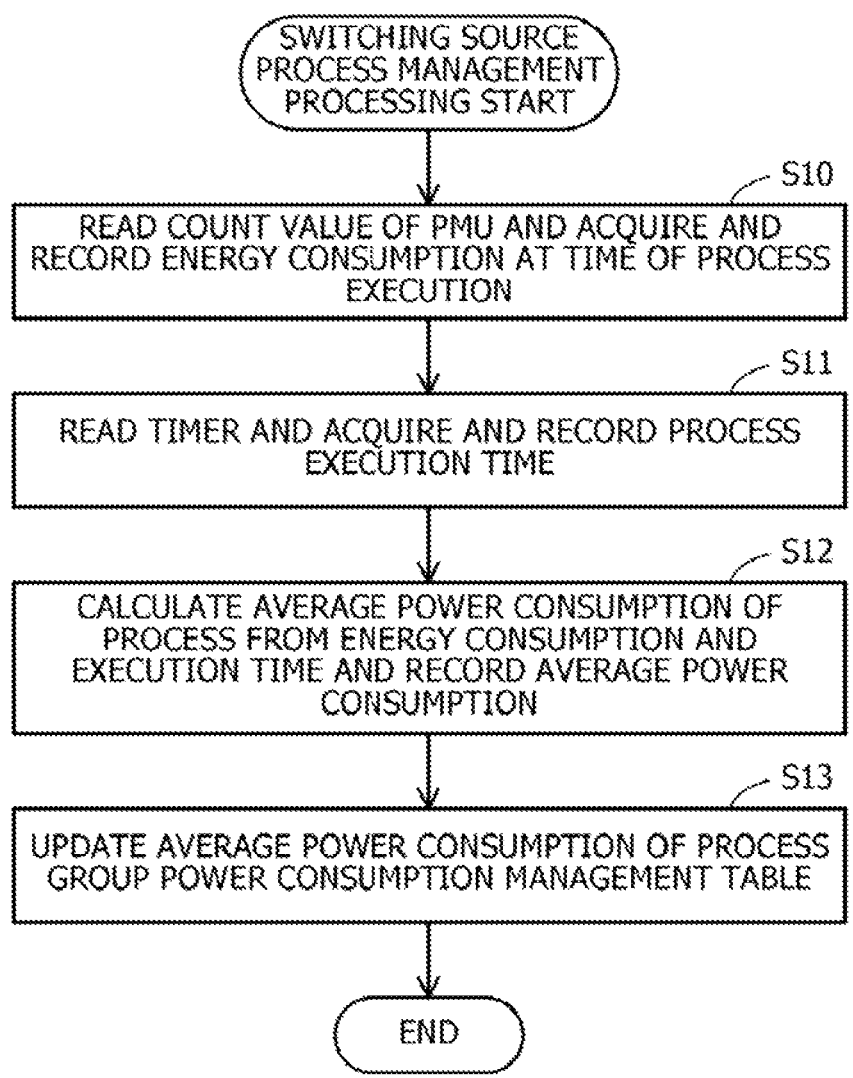
FIG. 8 is a flowchart illustrating an example of switching source process management processing.

FIG. 8 is a flowchart illustrating an example of switching source process management processing.

(S10) The energy consumption acquisition unit 182 reads the count value of the performance monitoring counter 122 of the PMU 120, acquires energy consumption at the time of process execution, and records the acquired energy consumption in the process power consumption management table 141. As described above, the performance monitoring counter 122 of the PMU 120 counts the number of occurrences C of an event in which the core 110 consumes a certain amount of energy E (J). Therefore, the energy consumption acquisition unit 182 can obtain energy consumption involved in execution of the switching source process according to a product of E and C. Note that the energy consumption acquisition unit 182 specifies the switching source process and the core 110 that has executed the switching source process by acquiring a process ID of the switching source process and information regarding the core 110 that has executed the switching source process from the process switching unit 181. After reading the count value, the energy consumption acquisition unit 182 resets the count value of the performance monitoring counter 122 to zero.

(S11) The energy consumption acquisition unit 182 reads the timer, acquires a process execution time, and records the process execution time in the process power consumption management table 141. For example, the energy consumption acquisition unit 182 acquires an execution time of the switching source process on the basis of the timer managed by the OS 150. The energy consumption acquisition unit 182 may obtain an execution time from a difference between a previous execution start time of the process managed by the OS 150 and a time of a time point when the process is switched to another process.

(S12) The energy consumption acquisition unit 182 calculates average power consumption of the process from the energy consumption recorded in step S10 and the execution time recorded in step S11 and records the average power consumption in the process power consumption management table 141. The energy consumption acquisition unit 182 calculates the energy consumption/the execution time as the average power consumption of the switching source process.

(S13) The energy consumption acquisition unit 182 updates the average power consumption of the process group power consumption management table 142. For example, the energy consumption acquisition unit 182 specifies a process group to which the process of which the average power consumption is recorded in step S12 belongs on the basis of the process power consumption management table 141. The energy consumption acquisition unit 182 calculates the average power consumption on the basis of the process power consumption management table 141 for the specified process group and records the average power consumption in the process group power consumption management table 142. In an example, regarding one process group, the energy consumption acquisition unit 182 sets a sum of the average power consumption of the processes belonging to the process group recorded in the process power consumption management table 141 as average power consumption in process group unit. Then, the energy consumption acquisition unit 182 ends the switching source process management processing.

Figure 9:
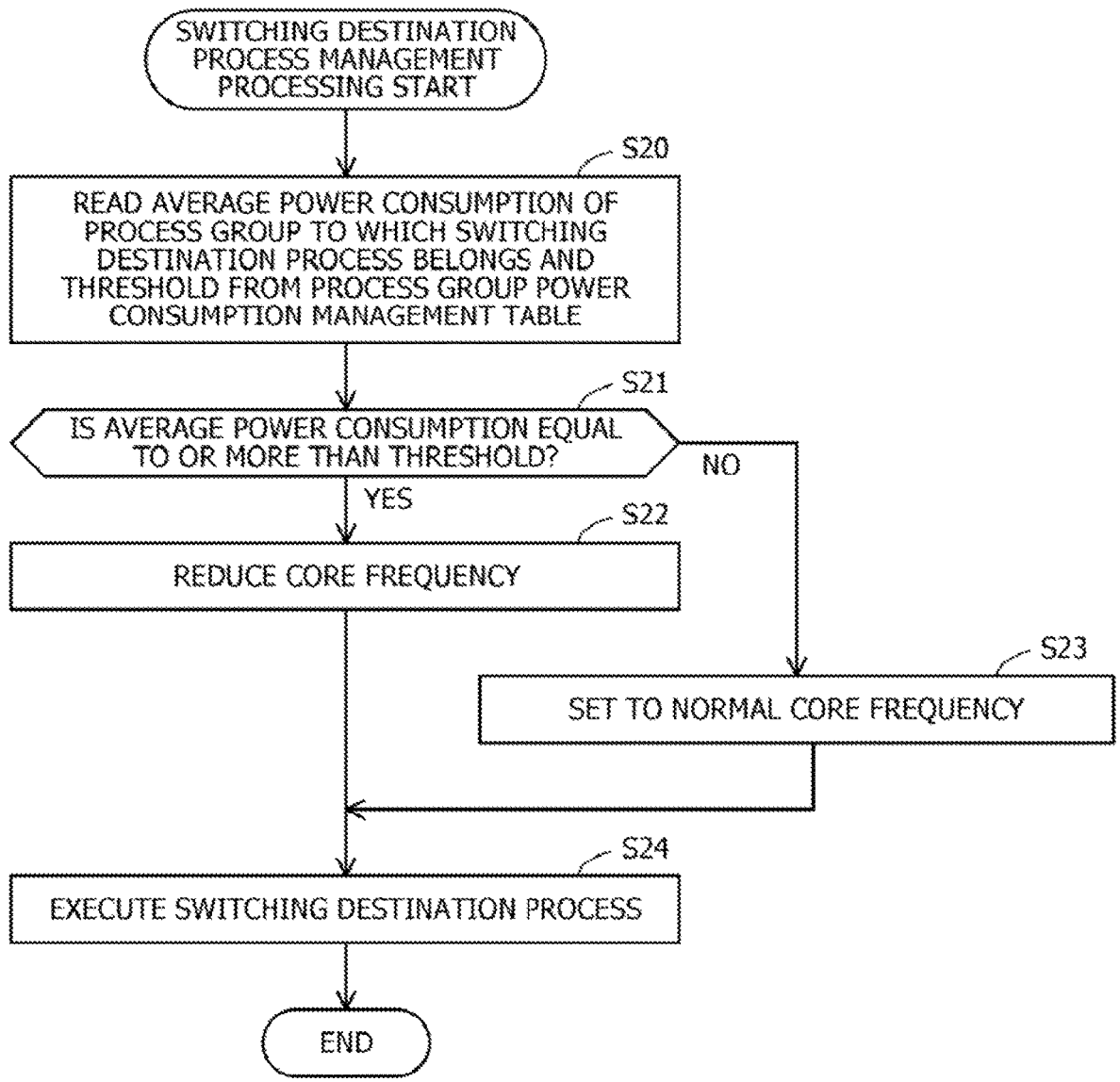
FIG. 9 is a flowchart illustrating an example of switching destination process management processing.

FIG. 9 is a flowchart illustrating an example of switching destination process management processing.

(S20) The core frequency control unit 183 reads average power consumption and a threshold of a process group to which the switching destination process belongs, from the process group power consumption management table 142. Note that the core frequency control unit 183 specifies the switching destination process and the core 110 to which the switching destination process is allocated by acquiring a process ID of the switching destination process and information regarding the core 110 to which the switching destination process is allocated from the process switching unit 181.

(S21) The core frequency control unit 183 determines whether or not the average power consumption read in step S20 is equal to or more than the threshold read in step S20. In a case where the average power consumption is equal to or more than the threshold, the core frequency control unit 183 proceeds the processing to step S22. In a case where the average power consumption is less than the threshold, the core frequency control unit 183 proceeds the processing to step S23.

(S22) The core frequency control unit 183 reduces the core frequency of the core 110. For example, the core frequency control unit 183 instructs the frequency control circuit 130a to operate at an operation frequency lower than a normal operation frequency. Upon receiving the instruction, the frequency control circuit 130a sets the operation frequency of the core 110 to be lower than the normal operation frequency. Then, the core frequency control unit 183 proceeds the processing to step S24.

(S23) The core frequency control unit 183 sets a normal core frequency to the core 110. For example, the core frequency control unit 183 instructs the frequency control circuit 130a to operate at the normal operation frequency. Upon receiving the instruction, the frequency control circuit 130a sets the operation frequency of the core 110 to the normal operation frequency. Then, the core frequency control unit 183 proceeds the processing to step S24.

(S24) The process switching unit 181 starts to execute the switching destination process by the core 110. The core 110 executes the process allocated by the process switching unit 181. Then, the process switching unit 181 ends the switching destination process management processing.

Note that the switching destination process management processing may be executed at the time of switching the process and after update of the process group power consumption management table 142 by the energy consumption acquisition unit 182. Alternatively, the switching destination process management processing may be executed at the time of switching the process and before the update of the process group power consumption management table 142 by the energy consumption acquisition unit 182.

Furthermore, the core frequency control unit 183 can reduce power consumption of the core 110 by reducing the operation frequency in step S22. The core frequency control unit 183 may reduce the power consumption of the core 110 by reducing a voltage supplied to the core 110 to be lower than a normal voltage, instead of or together with the reduction of the operation frequency.

Next, a specific transition example of the management information according to process switching will be described. In the following, an example will be described in which the switching destination process management processing is executed at the time of switching the process and after the update of the process group power consumption management table 142 by the energy consumption acquisition unit 182.

FIG. 10 is a diagram illustrating a first example of a transition of the management information.

It is assumed that the process switching unit 181 interrupts execution of the process with the process ID "100" executed by the core 110 and causes the core 110 to execute the process with the process ID "101" by switching the process. For example, the switching source process is the process with the process ID "100". The switching destination process is the process with the process ID "101".

For example, the energy consumption acquisition unit 182 acquires energy consumption 260 mJ and an execution time 100 ms for the process with the process ID "100". In this case, the energy consumption acquisition unit 182 records the energy consumption 260 mJ and the execution time 100 ms in the process power consumption management table 141 in association with the process ID "100". Furthermore, the energy consumption acquisition unit 182 records the average power consumption 260/100=2.6 W in the process power consumption management table 141 for the process ID "100". As a result, the energy consumption acquisition unit 182 updates the process power consumption management table 141 to a process power consumption management table 141a.

The energy consumption acquisition unit 182 updates average power consumption in the unit of the process group to which the process with the process ID "100" belongs according to update of the record with the process ID "100" in the process power consumption management table 141a.

For example, the energy consumption acquisition unit 182 specifies a process group ID "1" of the process group to which the process with the process ID "100" belongs on the basis of the process power consumption management table 141a. Then, the energy consumption acquisition unit 182 specifies process IDs "100" and "101" of the processes belonging to the process group with the process group ID "1" on the basis of the process power consumption management table 141a.

Then, the energy consumption acquisition unit 182 obtains a sum 2.6+2.5=5.1 W of the average power consumption corresponding to each of the process IDs "100" and "101" recorded in the process power consumption management table 141a. The energy consumption acquisition unit 182 records the process ID list "100, 101" and the average power consumption 5.1 W in the process group power consumption management table 142 for the process group ID "1". As a result, the energy consumption acquisition unit 182 updates the process group power consumption management table 142 to a process group power consumption management table 142a.

The core frequency control unit 183 specifies a process group ID "1" of the process group to which the switching destination process belongs for the process ID "101" of the switching destination process on the basis of the process group power consumption management table 142a. The core frequency control unit 183 refers to a record with the process group ID "1" in the process group power consumption management table 142a and acquires the average power consumption 5.1 W and the threshold five W. The core frequency control unit 183 compares the average power consumption 5.1 W with the threshold 5 W and determines that the average power consumption 5.1 W is equal to or more than the threshold five W. Then, the core frequency control unit 183 performs setting for reducing the operation frequency of the core 110 to be lower than the normal operation frequency. Thereafter, the process switching unit 181 causes the core 110 to start to execute the switching destination process with the process ID "101". The core 110 executes the process with the process ID "101" at the operation frequency lower than the normal operation frequency.

FIG. 11 is a diagram illustrating a second example of the transition of the management information.

Subsequent to the above, it is assumed that the process switching unit 181 interrupts execution of the process with the process ID "101" executed by the core 110 and causes the core 110 to execute the process with the process ID "100" by switching the process. For example, the switching source process is the process with the process ID "101". The switching destination process is the process with the process ID "100".

For example, the energy consumption acquisition unit 182 acquires energy consumption 230 mJ and an execution time 100 ms for the process with the process ID "101". In this case, the energy consumption acquisition unit 182 records the energy consumption 230 mJ and the execution time 100 ms in the process power consumption management table 141a in association with the process ID "101". Furthermore, the energy consumption acquisition unit 182 records average power consumption 230/100=2.3 W in the process power consumption management table 141a for the process ID "101". As a result, the energy consumption acquisition unit 182 updates the process power consumption management table 141a to a process power consumption management table 141b.

The energy consumption acquisition unit 182 updates average power consumption in the unit of the process group to which the process with the process ID "101" belongs according to update of the record with the process ID "101" in the process power consumption management table 141b.

For example, the energy consumption acquisition unit 182 specifies a process group ID "1" of the process group to which the process with the process ID "101" belongs on the basis of the process power consumption management table 141b. Then, the energy consumption acquisition unit 182 specifies the process IDs "100" and "101" of the processes belonging to the process group with the process group ID "1" on the basis of the process power consumption management table 141b.

Then, the energy consumption acquisition unit 182 obtains a sum 2.6+2.3=4.9 W of the average power consumption corresponding to each of the process IDs "100" and "101" recorded in the process power consumption management table 141b. The energy consumption acquisition unit 182 records the process ID list "100, 101" and the average power consumption 4.9 W in the process group power consumption management table 142a for the process group ID "1". As a result, the energy consumption acquisition unit 182 updates the process group power consumption management table 142a to the process group power consumption management table 142b.

The core frequency control unit 183 specifies a process group ID "1" of the process group to which the switching destination process belongs for the process ID "100" of the switching destination process on the basis of the process group power consumption management table 142b. The core frequency control unit 183 refers to a record with the process group ID "1" in the process group power consumption management table 142b and acquires the average power consumption 4.9 W and the threshold five W. The core frequency control unit 183 compares the average power consumption 4.9 W with the threshold 5 W and determines that the average power consumption 4.9 W is smaller than the threshold five W. Then, the core frequency control unit 183 sets the operation frequency of the core 110 to the normal operation frequency. Thereafter, the process switching unit 181 causes the core 110 to start to execute the switching destination process with the process ID "100". The core 110 executes the process with the process ID "100" at the normal operation frequency.

In this way, the core frequency control unit 183 controls the operation frequency of the core on the basis of the index of the energy consumption in process group unit.

By the way, in the examples in FIGS. 10 and 11, a case has been described where the plurality of processes belonging to the same process group is allocated to the core 110 in a time-division manner. However, the process switching unit 181 can flexibly allocate processes to each core.

Figure 12:
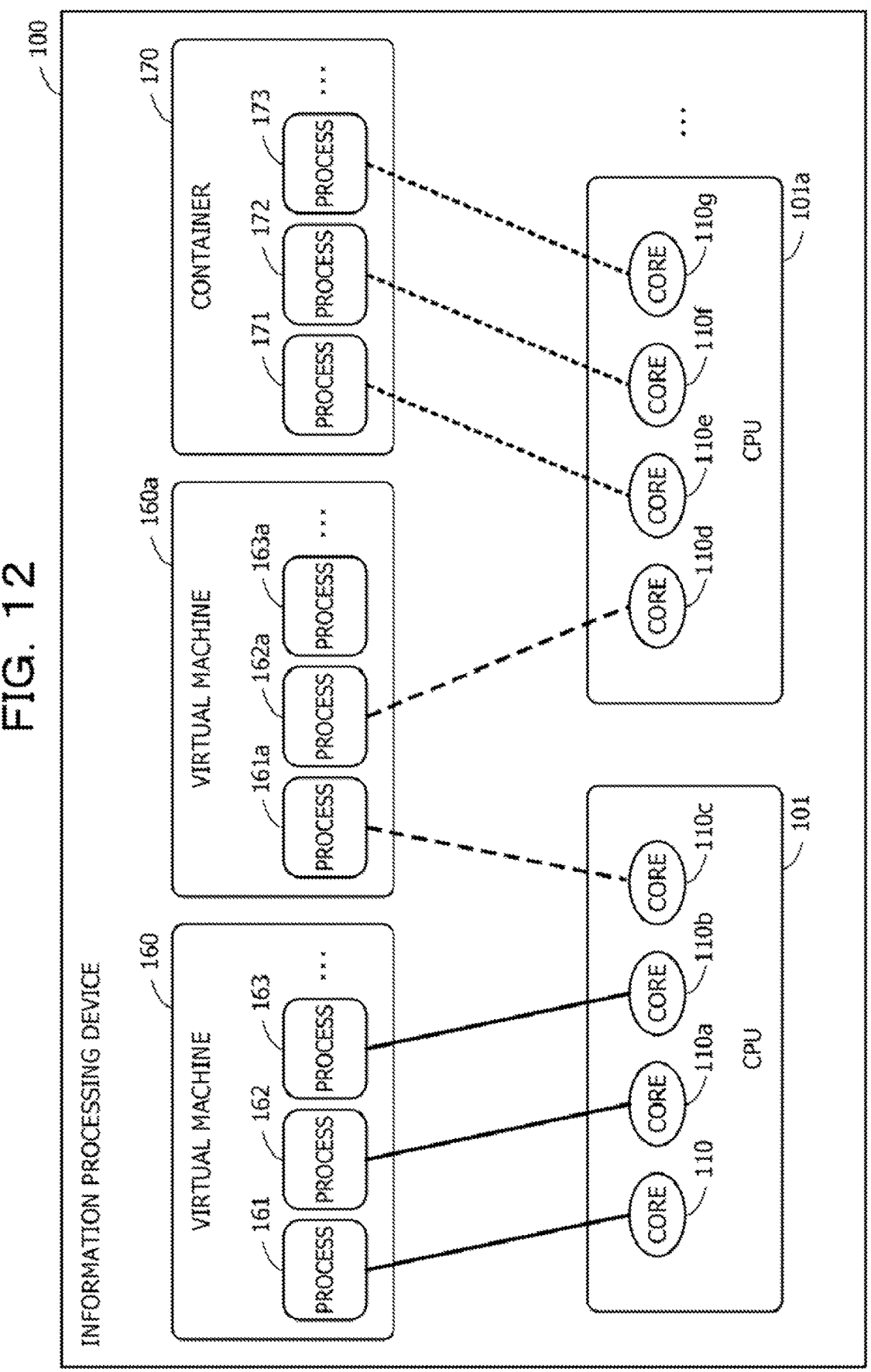
FIG. 12 is a diagram illustrating an example of allocation of processes to cores.

FIG. 12 is a diagram illustrating an example of allocation of processes to cores.

For example, the CPU 101 includes cores 110b and 110c in addition to the cores 110 and 110a. The CPU 101a includes cores 110d, 110e, 110f, and 110g. Furthermore, processes 161, 162, 163, . . . belong to a virtual machine 160. Processes 161a, 162a, 163a, . . . belong to a virtual machine 160a. Processes 171, 172, 173, . . . belong to a container 170. Each of the virtual machines 160 and 160a and the container 170 corresponds to one process group.

For example, at a certain time point, the cores 110 to 110g execute following processes belonging to the virtual machines 160 and 160a and the container 170. The core 110 executes the process 161. The core 110a executes the process 162. The core 110b executes the process 163. The core 110c executes the process 161a. The core 110d executes the process 162a. The core 110e executes the process 171. The core 110f executes the process 172. The core 110g executes the process 173. At this corresponding time, the process 163a is not allocated to any core, and execution of the process 163a is interrupted.

In this way, the process switching unit 181 may respectively allocate two processes belonging to the same process group to different cores. Furthermore, the process switching unit 181 may allocate two processes respectively belonging to different process groups to the same core.

The information processing device 100 changes the operation frequency and the voltage of each core for the process group. Therefore, the information processing device 100 can control the operations of the CPUs 101, 101a, . . . of the process group in detail.

For example, even in a case where a core that executes a process in a one process group and another core that executes a process in another process group exist in the same CPU, the information processing device 100 can control operation of the CPU for each process group. For example, as described above, the information processing device 100 can individually control the operation frequency and the voltage of each core according to the process group.

Therefore, for example, the information processing device 100 can prevent power consumption caused by a calculation by one process group from being excessive and can increase a speed of calculation for a process group with relatively small power consumption. Alternatively, by adjusting the threshold for each process group, control can be performed for causing a process group with higher importance or higher priority to use a relatively large amount of power resources.

Furthermore, the unit of the process group corresponding to the job, the application, the virtual machine, the container, or the like may be used as one unit of a service provided to a user. Therefore, by making it possible to control the operation of the CPU in process group unit, the information processing device 100 can easily perform control in consideration of power efficiency, charging according to power consumption at the time when a user uses a service, or the like.

Note that, in the second embodiment, an example has been described in which each of the CPUs 101, 101a, . . . includes the plurality of cores. However, the number of cores included in each CPU may be one. For example, the information processing device 100 may include a plurality of single core processors. In this case, the information processing device 100 can efficiently use the plurality of CPUs included in the information processing device 100 for each process group.

Furthermore, as the index of the energy consumption in process group unit, it is assumed that the energy consumption acquisition unit 182 obtains the sum (integrated value) of the average power consumption of the processes belonging to the process group. However, the index may be obtained using other calculations.

For example, the energy consumption acquisition unit 182 may use the average value of the energy consumption per unit time of each process belonging to the corresponding process group as the index. As an example, the energy consumption acquisition unit 182 may set the index of the energy consumption of the process group ID "1" as (2.6+2.3)/2=2.45 W for the process power consumption management table 141b in FIG. 11. In this case, a threshold according to the calculation method is preset to the process group power consumption management table 142b.

As still another example, the energy consumption acquisition unit 182 may set a value obtained by dividing a sum of the energy consumption recorded for each process belonging to the corresponding process group by a sum of the execution time recorded for each process belonging to the corresponding process group as the index. As an example, the energy consumption acquisition unit 182 may set the index of the energy consumption of the process group ID "1" as (260+230)/(100+100)=2.45 W for the process power consumption management table 141b in FIG. 11. Also in this case, a threshold according to the calculation method is preset to the process group power consumption management table 142b.

The energy consumption acquisition unit 182 may change an index calculation method according to whether or not a plurality of processes belonging to a process group is executed at the same time. For example, in a case where the plurality of processes belonging to the same process group is executed at the same time, the energy consumption acquisition unit 182 sets the sum of the average power consumption of each process as the index, and in a case where the plurality of processes is not executed at the same time, it is also considered to use another calculation method described above.

For example, the information processing device 100 executes the following processing.

When a process executed by a first processor core among a plurality of processor cores is switched from a first process to a second process, the energy consumption acquisition unit 182 acquires a first process execution time and energy consumption of the first processor core in the execution time. The energy consumption acquisition unit 182 specifies existing one or more processes belonging to a first process group, to which the first process belongs, from among a plurality of process groups each of which is a group of processes. The energy consumption acquisition unit 182 calculates an index indicating energy consumption per unit time involved in the execution of the first process group on the basis of an execution time and energy consumption acquired for the specified corresponding one or more processes. When starting to execute a process belonging to the first process group next, the core frequency control unit 183 controls an operation of a processor core to which the process is allocated according to comparison between the index calculated for the first process group and a threshold.

As a result, the information processing device 100 can efficiently use the processor. Each of the CPUs 101, 101a, . . . is an example of the processor. Each of the cores 110, 110a, . . . is an example of the processor core. Each of the virtual machines 160, 160a, . . . and the containers 170, 170a, . . . is an example of the process group. The process group may be a unit such as a job or an application.

Here, for example, the existing one or more processes belonging to the first process group are processes currently managed by an operating system and may be one or more processes executed at the same time in the first process group. Furthermore, the one or more processes may include a process that currently exists and of which execution is interrupted (process waiting for being executed).

In the control of the operation of the processor core, the core frequency control unit 183 controls at least one of the operation frequency and the voltage of the processor core.

As a result, the information processing device 100 can save power of the processor core and can increase the speed of the calculation.

In the control of the operation of the processor core, in a case where the index is equal to or more than the threshold, the core frequency control unit 183 reduces at least one of the operation frequency and the voltage of the processor core.

As a result, the information processing device 100 can reduce the power consumption of the processor core and save power.

Alternatively, in the control of the operation of the processor core, in a case where the index is equal to or less than the threshold, the core frequency control unit 183 may perform control for increasing the operation frequency of the processor core. As a result, the information processing device 100 can allocate a larger power resource to a process group estimated to have relatively small power consumption and increase the speed of the calculation.

Furthermore, in the calculation of the index described above, the energy consumption acquisition unit 182 may calculate energy consumption of the processor core per unit time at the time when each of one or more processes is executed on the basis of the execution time and the energy consumption acquired for the one or more processes belonging to the first process group. Then, the energy consumption acquisition unit 182 may calculate an integrated value (sum) of the energy consumption per unit time at the time when each of the one or more processes is executed as the index described above.

As a result, the information processing device 100 can appropriately obtain the index of the energy consumption in process group unit.

Alternatively, the energy consumption acquisition unit 182 may calculate an average value of the energy consumption of the processor core per unit time at the time when each of the one or more processes is executed as the index described above, on the basis of the execution time and the energy consumption acquired for the one or more processes belonging to the first process group.

Even in this way, the information processing device 100 can appropriately obtain the index of the energy consumption in process group unit.

Furthermore, when acquiring the energy consumption of the first processor core, the energy consumption acquisition unit 182 may read the number of occurrences of the event counted by a counter included in the first processor core and acquire the energy consumption on the basis of the read number of occurrences of the event. The counter counts the number of occurrences of the event according to the energy consumed by the first processor core. Furthermore, after reading the number of occurrences of the event from the counter, the energy consumption acquisition unit 182 resets the counter to zero.

As a result, the information processing device 100 can appropriately acquire the energy consumption of the first processor core involved in the execution of the first process. For example, the counter included in the processor core counts events according to relatively fine energy consumption in processor core unit. Therefore, the information processing device 100 can accurately acquire the energy consumption involved in the execution of the process in processor core unit. Resetting the counter to zero corresponds to setting the count value of the number of occurrences of the event by the counter to zero. The performance monitoring counter 122 is an example of the counter described above.

When comparing the index described above with the threshold, the core frequency control unit 183 may acquire the threshold corresponding to the first process group from the memory that holds the threshold corresponding to each of the plurality of process groups and compare the acquired threshold with the index.

As a result, the information processing device 100 can change a reference value (threshold) of the index used to control the operation of the processor core, according to the process group. For example, the information processing device 100 can control the operation of the processor core according to importance, priority, or the like of the process group or can control the operation of the processor core according to a charging amount of a user or the like corresponding to each process group. For example, the information processing device 100 may set the threshold corresponding to the process group to be higher as the importance or the priority of the process group is higher. Furthermore, for example, the information processing device 100 may set the threshold corresponding to the process group used by the user to be higher as the charging amount of the user is more. Note that the RAM 102 is an example of the memory described above. The memory that holds the threshold may be implemented by the HDD 103, the SSD, or the like.

Furthermore, the plurality of processor cores is included in one or the plurality of processors of the information processing device 100. For example, the information processing device 100 may include a multi-core processor or may include a plurality of multi-core processors. Furthermore, the information processing device 100 may include a plurality of single core processors.

In this way, the information processing device 100 can efficiently use the processors having various processor configurations.

Note that the information processing according to the first embodiment may be achieved by causing the processor 12 to execute the program. Furthermore, the information processing according to the second embodiment may be achieved by causing the CPUs 101, 101a, ... to execute the program. The program may be recorded in the computer-readable recording medium 53.

For example, the program may be distributed by distributing the recording medium 53 in which the program is recorded. Alternatively, the program may be stored in another computer and distributed via a network. For example, a computer may store (install) the program, which is recorded in the recording medium 53 or received from another computer, in a storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute processing comprising:
   acquiring a first process execution time and energy consumption of a first processor core in the execution time when a process executed by the first processor core of a plurality of processor cores is switched from a first process to a second process;
   specifying one or more processes that belong to a first process group to which the first process belongs, from among a plurality of process groups each of which is a group of processes and calculating an index that indicates the energy consumption per unit time involved in execution of the first process group on the basis of the execution time and the energy consumption acquired for the specified one or more processes;
   comparing the index calculated for the first process group with a threshold when execution of the process that belongs to the first process group is started next;
   reducing a core frequency of the first processor core or a voltage supplied to the first processor core when determining the index is equal to or more than the threshold;
   setting a normal core frequency or a normal voltage to the first processor core when determining the index is not equal to or more than the threshold; and
   starting the execution of the process that belongs to the first process group by the first processor core.

2. The non-transitory computer-readable recording medium according to claim 1, wherein in the calculation of the index, the energy consumption of the processor core per unit time at the time when each of the one or more processes is executed is calculated on the basis of the execution time and the energy consumption acquired for the one or more processes, and an integrated value of the energy consumption per unit time when each of the one or more processes is executed is calculated.

3. The non-transitory computer-readable recording medium according to claim 1, wherein in the calculation of the index, an average value of the energy consumption of the processor core per unit time when each of the one or more processes is executed is calculated on the basis of the execution time and the energy consumption acquired for the one or more processes.

4. The non-transitory computer-readable recording medium according to claim 1, wherein in the acquisition of the energy consumption, the number of occurrences of an event is read that is counted by a counter that is included in the first processor core and counts the number of occurrences of the event according to energy consumed by the first processor core, the energy consumption is acquired on the basis of the read number of occurrences of the event, and the counter is reset to zero.

5. The non-transitory computer-readable recording medium according to claim 1, wherein in the comparison between the index and the threshold, the threshold that corresponds to the first process group is acquired from a memory that holds the threshold that corresponds to each of the plurality of process groups, and the acquired threshold is compared with the index.

6. The non-transitory computer-readable recording medium according to claim 1, wherein the plurality of processor cores is included in one or a plurality of processors in the computer.

7. A management method comprising:
   acquiring, by a computer, a first process execution time and energy consumption of a first processor core in the execution time when a process executed by the first processor core of a plurality of processor cores is switched from a first process to a second process;
   specifying one or more processes that belong to a first process group to which the first process belongs, from among a plurality of process groups each of which is a group of processes and calculating an index that indicates the energy consumption per unit time involved in execution of the first process group on the basis of the execution time and the energy consumption acquired for the specified one or more processes;
   comparing the index calculated for the first process group with a threshold when execution of the process that belongs to the first process group is started next;
   reducing a core frequency of the first processor core or a voltage supplied to the first processor core when determining the index is equal to or more than the threshold;
   setting a normal core frequency or a normal voltage to the first processor core when determining the index is not equal to or more than the threshold; and
   starting the execution of the process that belongs to the first process group by the first processor core.

* * * * *